United States Patent [19]

Irwin

[11] 3,908,283

[45] Sept. 30, 1975

[54] ADAPTER FOR HEADLAMP AIMING MECHANISM

[75] Inventor: Lee K. Irwin, Emporia, Kans.

[73] Assignee: Hopkins Manufacturing Corporation, Emporia, Kans.

[22] Filed: Sept. 14, 1973

[21] Appl. No.: 397,368

[52] U.S. Cl. ................................................. 33/288
[51] Int. Cl.² ........................................... G01B 5/25
[58] Field of Search .......... .......... 33/288, 335, 180 L; 248/206 R, 263; 279/3

[56] References Cited
UNITED STATES PATENTS

| | | | |
|---|---|---|---|
| 2,997,914 | 8/1961 | Hopkins.............................. | 279/3 X |
| 3,672,063 | 6/1972 | Hopkins et al................... | 248/263 X |

*Primary Examiner*—Richard E. Aegerter
*Assistant Examiner*—Michael H. Thaler
*Attorney, Agent, or Firm*—Burns, Doane, Swecker & Mathis

[57] ABSTRACT

An adapter unit for adapting a headlamp aiming unit to test a diverse headlamp. The adapter unit includes seating surfaces which correspond to the reference surfaces of the diverse headlamp, and reference surfaces which correspond to seating surfaces on the aiming unit. The aiming unit includes a holding mechanism for securing the aiming unit against the adapter unit. The adapter unit includes a force transmitting mechanism which transmits the aimer-generated holding forces in a manner augmenting the forces holding the adapter unit to the headlamp.

16 Claims, 6 Drawing Figures

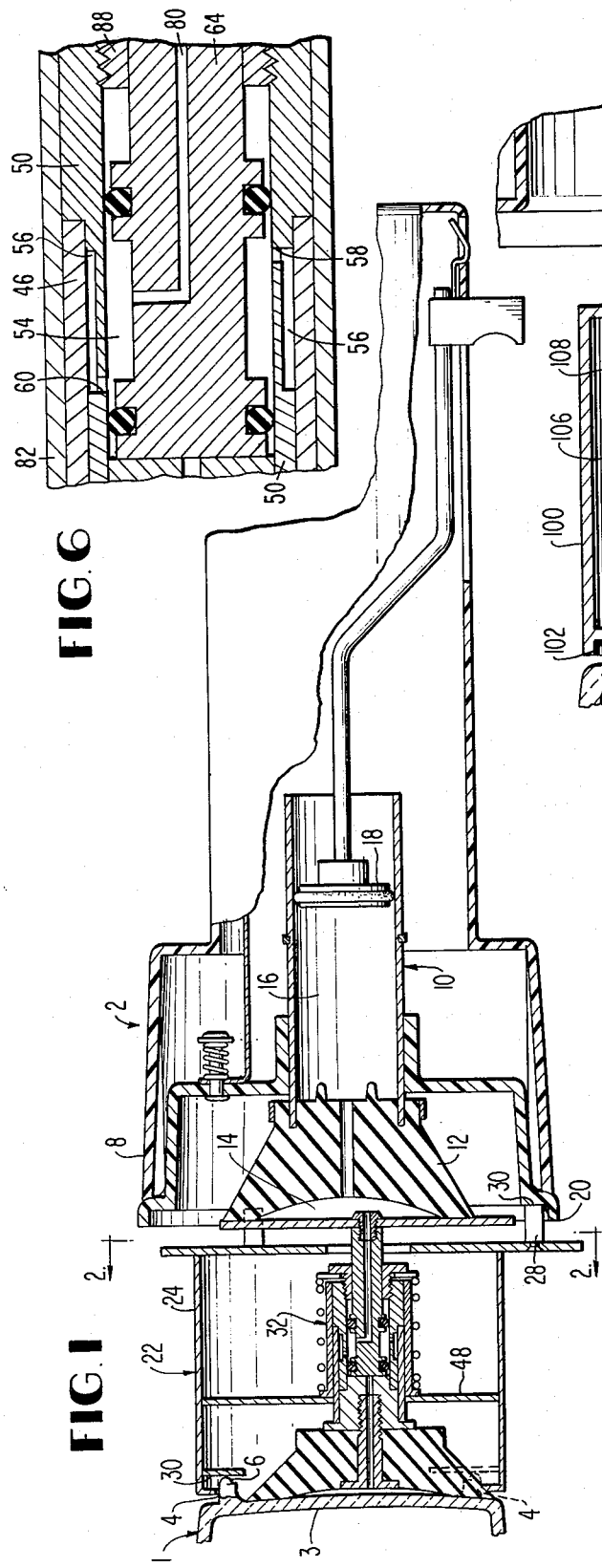
FIG.6
FIG.1
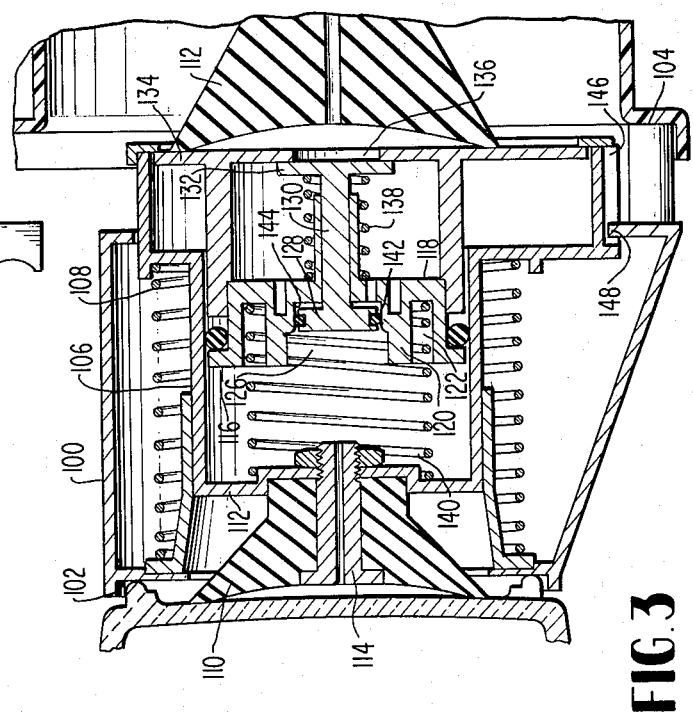
FIG.3
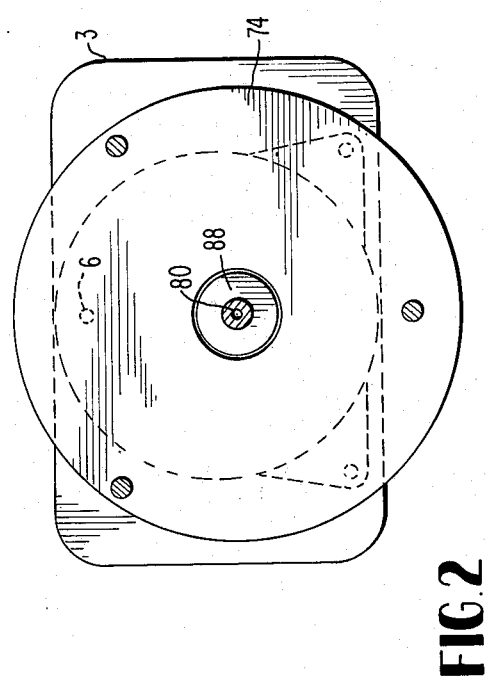
FIG.2

3,908,283

ADAPTER FOR HEADLAMP AIMING MECHANISM

BACKGROUND OF THE INVENTION

This invention relates to the testing of vehicle headlamp alignment and more particularly relates to an adapter unit for adapting a headlamp aiming unit to test diverse headlamps.

Automobile headlamps project beams of light which, while being operable to provide night-time visibility, may tend to produce a glare in the eyes of oncoming drivers. Consequently, these headlamps are conventionally mounted for adjustment so as to enable the projected beams of light to be suitably directed for producing adequate visibility with minimum glare to oncoming drivers. Such adjustment may occur initially at the time of manufacture and periodically thereafter in various vehicle inspection and service stations.

Devices have been heretofore developed for rapidly and accurately testing the alignment of headlamps with respect to the longitudinal axis of the associated vehicle to determine whether the beams are properly aimed. One such aiming device which has proven to be effective is disclosed in U.S. Pat. No. 2,997,914, assigned to the assignee of the subject invention, and the disclosure of which being herein incorporated by reference.

Such an aiming device may typically include a frame having prearranged seating surfaces which correspond to, and are alignable with, reference surfaces on an associated headlamp. Mounted on the frame is a retaining assembly, such as a suction cup, for releasably securing the aimer to the headlamp to produce firm engagement between the seating and reference surfaces. Arranged within the frame is an alignment system for determining whether the longitudinal axis of the headlamp is properly oriented horizontally with respect to the longitudinal axis of the vehicle. Numerous aiming devices operating under these principles were designed and constructed specifically for testing the alignment of headlamps of circular configuration. Many headlamps presently utilized however, particularly those of retangular shape, are configured in a manner which restricts the ability of the above-described aiming units to function properly in connection therewith. It would thus be desirable to provide means for adapting conventional headlamp aiming devices for selective use in testing non-circular headlamps, such as those of the rectangular configuration.

OBJECTS OF THE INVENTION

It is therefore a general object of the invention to obviate or minimize problems of the types discussed above.

It is another general object of the invention to provide novel methods and apparatus for adapting a headlammp aiming unit to test headlamps of diverse configurations.

It is a particular object of the invention to provide an adapter unit employable in conjunction with a conventional circular headlamp aiming unit to facilitate the testing thereby of rectangular headlamps.

It is another particular object of the invention to provide an adapter unit which may be attached to a headlamp by means of its own independently produced holding forces.

It is a further particular object of the invention to provide a novel adapter unit which utilizes holding forces generated by an associated aiming unit to facilitate firm engagement thereof against a headlamp being tested.

SUMMARY OF THE INVENTION

At least some of the foregoing objects are accomplished by the provision of an adapter unit which may be used in conjunction with a vehicle headlamp aiming unit. The aiming unit is of a kind suitable for testing a first type of headlamp and includes an aimer holding mechanism for securing the aiming unit to an adjacent element, such as the first headlamp, and aimer seating surfaces for orienting the aiming unit with respect to corresponding reference surfaces. The adapter unit is operable to adapt the aiming unit for testing the alignment of a second type of headlamp, diverse from the first type, and includes adapter seating surfaces which correspond to reference surfaces of the second type of headlamp, as well as adapter reference surfaces which correspond to the aimer seating surfaces. The adapter includes a portion which is operable to be acted upon by forces generated by the aimer holding mechanism for securing the aiming unit to the adapter unit. The adapter unit further includes a mechanism for transmitting these forces in a manner causing the adapter unit to be firmly held against the headlamp.

In one embodiment of the invention the aimer holding mechanism includes a suction cup and a suction generating apparatus for securing the aiming unit to the adapter unit. The force transmitting means of the adapter unit includes a valving arrangement for transmitting these suction forces to a suction cup of the adapter unit for attaching the adapter unit to the headlamp. These transmitted forces thus serve to augment the suction forces which are independently produced by the adapter unit. The aiming unit and adapter unit are further arranged such that the suction forces produced by the aiming unit are transmitted to a frame portion of the adapter to press the adapter seating surfaces against the headlamp reference surfaces.

Further objectives of the invention are accomplished by the provision of a method for adapting an aiming unit, capable of testing the alignment of a first vehicle headlamp, for testing the alignment of a second, diverse headlamp. The method comprises the steps of attaching an adapter unit to the second headlamp such that adapter seating surfaces are aligned with corresponding reference surfaces on the headlamp; and subsequently attaching the aiming unit to the adapter unit such that seating surfaces on the aiming unit are aligned with corresponding reference surfaces on the adapter unit.

THE DRAWINGS

In describing the invention, reference will be made to a preferred embodiment shown in the appended drawings.

In the drawings:

FIG. 1 is a longitudinal sectional view of an adapter unit, in accordance with one embodiment of the invention, and an associated aiming unit.

FIG. 2 is a cross-sectional view taken along line 2—2 of FIG. 1.

FIG. 3 is a longitudinal sectional view of an adapter unit, according to a second embodiment of the invention, and its associated aiming unit.

FIG. 6 is a fragmentary, enlarged view of the adapter unit shown in FIG. 4.

DESCRIPTION OF THE PREFERRED EMBODIMENT OF THE INVENTION

Figures 4, 5:
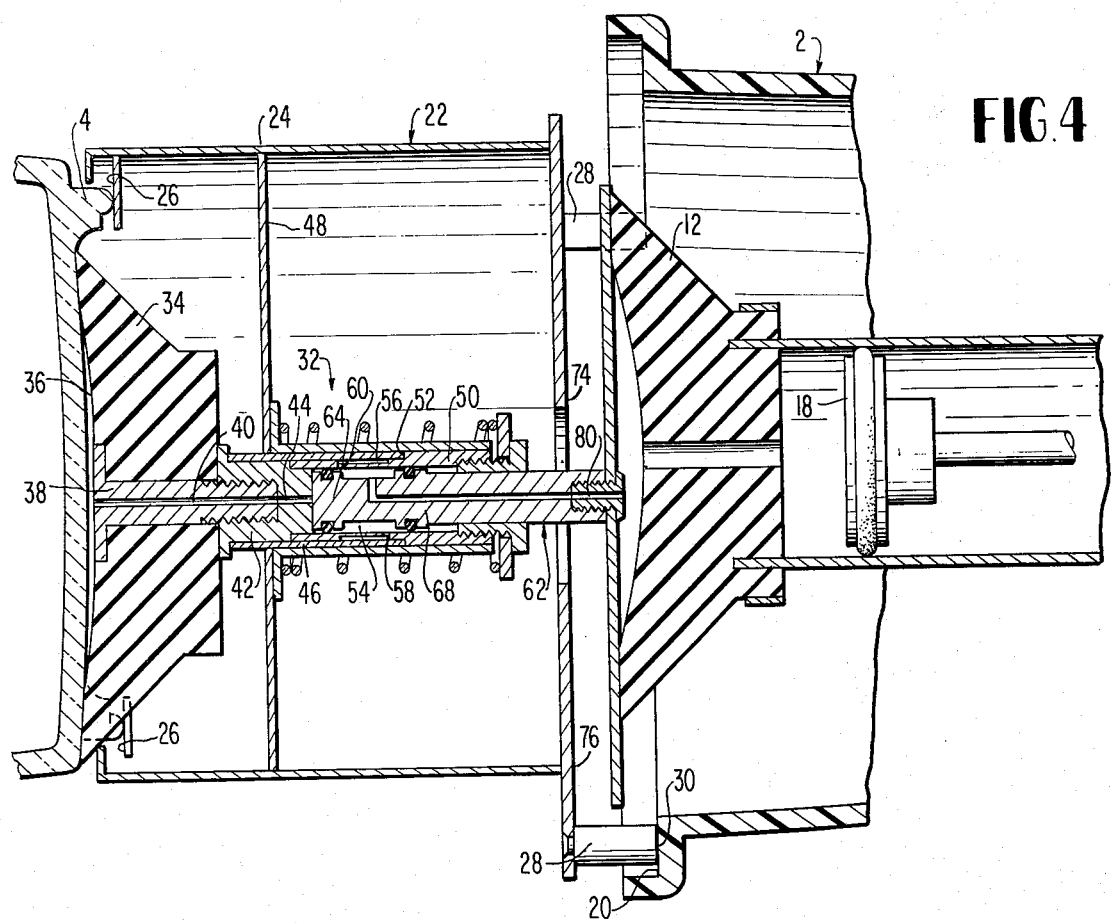
FIG. 4 is a longitudinal sectional view of the adapter unit, according to the first embodiment, in one stage of assemblage to an associated aiming unit.
FIG. 5 is a view similar to FIG. 4, showing the adapter unit in a completed stage of assemblage to the associated aiming unit.

One preferred form of an adapter unit in accordance with the invention is illustrated in FIG. 1 as being operably disposed between a headlamp 1 and a conventional aiming unit 2. The aiming unit illustrated is of the type disclosed in Hopkins U.S. Pat. No. 2,997,914, the disclosure of which being incorporated herein by reference.

The headlamp includes a preferably rectangular lense 3 which is provided with three conventional aligning pins 4. The aligning pins include reference surfaces 6 which define a reference plane. This defined plane is indicative of the orientation of the headlamp.

The aiming unit includes a frame 8 and a holding mechanism preferably in the form of a suction generating assembly 10. The suction generating assembly 10 includes a suction cup 12 having a suction cavity 14, a suction chamber 16 communicating with the suction cavity, and a suction generating piston 18 slidably disposed in the suction chamber. The piston is operable to produce a suction within the cavity 14, to cause the suction cup to adhere to a surface, such as the lense of a conventional circular headlamp. Seating surfaces 20 are disposed on the periphery of the aimer frame and correspond preferably to reference surfaces conventionally carried by circular headlamps.

With the suction cup adhered to a circular headlamp, and with the seating surfaces 20 seated on the reference surfaces of the circular headlamp, the aiming unit would be in its normal operational posture to test the directional alignment of the headlamp. Such an aiming unit, while being capable of testing various sized headlamps, through the addition thereto of adapter rings or the like, may be restricted in its capability of testing certain types of headlamps, such as rectangular headlamps, due to certain structural characteristics thereof which are diverse, i.e., different from the characteristics of conventional circular headlamps.

Consequently, in accordance with the invention, an adapter unit is provided to adapt the aiming unit for testing headlamps, particularly rectangular headlamps, which the aiming unit is unable to test independently. A preferred adapter unit 22, depicted in FIGS. 1, 4, and 5, includes a frame 24 on which are provided three seating surfaces 26 which correspond to the reference surfaces of the rectangular headlamp 1. At the opposite end of the frame are mounted three reference pins 28 having reference surfaces 30 for defining a reference plane. This reference plane is indicative of the orientation of the headlmap when the adapter unit 22 is held thereagainst as shown in FIG. 1. The frame 24 is slidably mounted on a holding mechanism 32.

Referring to FIG. 4, the holding mechanism 32 includes a suction cup 34 having a suction cavity 36. The suction cup includes a hollow tube 38 which defines a passage 40 opening into the suction cavity. Attached to a threaded end portion of the hollow tube is a circular collar 42 which abuts against the suction cup 34. The collar 42 includes an opening 44 which aligns with the passage 40.

Mounted on the collar 42 is a cylindrical housing 46 which slidably extends through an opening in an internal flange 48 of the frame 24. Affixed to the cylindrical housing 46 is a sleeve 50. The sleeve 50 includes a shoulder 52 which abuts an end of the cylindrical housing 46. The internal portion of the sleeve defines a chamber 54. A recessed portion of the sleeve defines, in conjunction with the inner surface of the cylindrical housing, an annular cavity 56 encircling the chamber 54. A pair of axially spaced ports 58 and 60 are provided in the sleeve 50. These ports serve to communicate the annular cavity 56 with the chamber 54, thereby enabling the annular cavity to function as a fluid by-pass passage as will be subsequently explained in greater detail.

Reciprocally mounted within the chamber 54 is a piston valve assembly 62. The piston assembly 62 includes a forward piston head 64 having a circular seal 66 which sealingly engages the inner surface of the sleeve 50. The piston assembly further includes a second piston head 68 which is separated from the forward piston head by a portion 70 of reduced diameter.

The second piston head 68 is provided with an annular seal 72 which sealingly engages the inner surface of the sleeve. The rear portion of the piston assembly extends rearwardly through an opening in a rear wall 74 of the frame 24. Affixed to the rear portion of the piston assembly is an abutment plate 76. Extending through the piston assembly and the abutment plate is a conduit 80 which opens into the chamber 54.

As noted, the frame 24 is shiftable relative to the holding mechanism and is provided with a cylindrical guide 82 having a rim 83 abutting flange 48 (FIG. 5). The guide is slidably mounted on the cylindrical housing 46 and the sleeve 50. A compression spring 84 is operably disposed between the guide and a washer 86. The washer 86 abuts a cap 88, which is adjustably threadedly coupled to the sleeve 50 and which slidably receives the piston assembly 62. Thus, by adjusting the cap 88, the pressure on the flange 48 and the seating surfaces 26 may be regulated.

OPERATION

When it is desired to test the alignment of the headlamp 1 utilizing the conventional aiming device 2, the adapter unit 22 is initially attached to the lense 3 by placing the adapter suction cup 34 against the lense with the adapter seating surfaces 26 aligned with the lense reference surfaces 6. By then pushing against the abutment plate 76, the forward piston head 64 will be driven forwardly within the chamber 54 and will force air through the outer edges of the suction cup 34 thereby creating a vacuum within the suction cavity 36 suitable for securing the adapter unit to the headlamp (FIG. 4). Negative pressure will be sealed within the suction cavity by means of the annular seal 66 disposed around the forward piston head 64.

With the adapter unit positioned in this manner, the adapter seating surfaces 26 will be held against the headlamp reference surfaces 6 by the spring 84.

To attach the aiming unit 2 to the adapter unit 22, the seating surfaces 20 on the aimer frame 8 are initially oriented so as to be properly aligned with the adapter reference surfaces 30. The aimer suction cup 12 is then pressed against the abutment plate 76. The aimer piston 18 is pushed forwardly in the conventional fashion to evacuate air from the aimer suction cavity 14 (FIG. 4). Upon pulling the piston 18 rearwardly, a vacuum is produced within the aimer suction cavity, tending to lock the suction cup to the plate. As the piston 18 is shifted progressively rearwardly, the suction forces produced within the suction cavity 14 increase until they surpass the suction forces present in the suction cavity 36 of the adapter suction cup.

At this point, the abutment plate 76 will be drawn rearwardly, thereby shifting the forward piston head 64 rearwardly, away from the adapter suction cavity until the rearward piston head 68 engages the cap 88 (FIG. 5). As a result, the forward piston head 64 will be disposed intermediate the axially spaced ports 58 and 60. In this fashion, a channel will formed by the passage 40, the opening 44, the chamber 54, the annular by-pass cavity 56, and the conduit 80 to provide communication between the adapter suction cavity 36 and the aimer suction cavity 14. Consequently, the suction forces generated by the aiming unit are now applied to the adapter suction cup to augment the suction forces of the adapter unit to increase the holding action between the adapter unit and the headlamp.

Moreover, the suction forces generated by the aiming unit urge the piston 18 and the frame 8 of the aiming unit against the adapter unit. In this fashion, the seating surfaces 20 will bear against the pins 28 to push the frame 24, and the seating surfaces 26 firmly against the headlamp seating surfaces. Thus, the holding forces generated by the spring 84 will be augmented by the holding forces generated by the aimer suction mechanism.

An alternate embodiment of an adapter unit suitable for use in conjunction with a headlamp aimer unit is illustrated in FIG. 3 and includes an outer casing 100 having three seating surfaces 102 disposed on a forward portion thereof and three reference surfaces 104 carried on a rearward portion thereof. The casing is slidably mounted on an intermediate frame element 106, and a compression spring 108 is disposed therebetween. A suction cup 110 is attached to a forward wall 112 of the intermediate frame element by means of a hollow pin 114.

Slidably mounted within the intermediate frame element is a plunger 116 which includes a circular wall 118 and an annular flange 120 projecting therefrom. The flange 120 defines an annular groove 122 and an inner recess 126. A relief valve is slidably mounted in the plunger 116 and includes a piston head 128 slidably disposed within the recess 126 and a rod portion 130 reciprocally mounted within an opening formed in the circular wall 118. An enlarged flange portion 132 is mounted at the end of the rod portion 130.

An abutment plate 134 is attached to the plunger 116 and includes a pressure relief aperture 136. A compression spring 138 biases the enlarged flange 132 against the abutment plate 134 to seal the aperture 136.

A compression spring 140 is disposed between the forward wall 112 and the plunger 116 to bias the plunger away from the suction cup 110.

The piston head 128 includes an annular sealing ring 142 which is operable to engage a stepped-in portion 144 of the recess 126. The remaining portion of the recess is, however, larger than the annular seal 142 and no sealing engagement therebetween is afforded.

The intermediate frame member is provided with a boss 146 which is reciprocally guided within a slot 148 in the outer casing 100.

To install the adapter onto a rectangular headlamp 1, the outer casing 100 may be positioned adjacent the headlamp wherein the adapter seating surfaces 102 abut the headlamp reference surfaces 6. The abutment plate 134 is then pushed forwardly such that the suction cup 110 seats firmly against the headlamp and the plunger 116 travels forwardly to evacuate air through the outer lips of the suction cup.

When the abutment plate 134 is released, the compression spring 140 urges the plunger 116 rearwardly in a manner generating substantial vacuum within the suction cavity of the suction cup 110. In this posture the adapter will be firmly adhered to the headlamp, with the seating surfaces 102 being biased against the headlamp reference surfaces 6 by the compression spring 108. A conventional aiming unit may now be attached in a conventional manner to the abutment plate 134. For example, the aiming unit 2 described in accordance with FIG. 1 would be attached to the adpater unit by seating the aimer seating surfaces against the adapter reference surfaces 104 and then attaching the suction cup to the abutment plate 134. The aimer-generated suction forces will be transmitted through the aimer frame 8 and will be exerted against the reference surfaces 104 of the adapter unit. In this fashion, the forces generated by the aiming unit will augment the forces of the compression spring 108 to hold the adapter seating surfaces 102 in firm engagement with the headlight reference surfaces 6.

When it is desired to remove the testing equipment from the headlamp, the aiming unit 2 is removed in conventional fashion by relieving the pressure within its suction cavity. The adapter unit is then removed by pressing the enlarged flange 132 inwardly against the bias of the compression spring 138, until the sealing ring 142 passes beyond the stepped-in portion 144. At this point the adapter suction cup is vented to atmosphere through the relief opening 136 and the adapter may be easily removed from the headlamp.

MAJOR ADVANTAGES AND SCOPE OF THE INVENTION

The present invention provides an adapter unit which enables an aiming unit to test certain types of headlamps which it is unable to test independently. Such an adapter unit is particularly advantageous when used in conjunction with an aiming unit of the type disclosed, to test rectangular headlamps.

The adapter unit is arranged wherein the suction holding forces produced by the associated aiming unit may be transmitted to augment forces which press the adapter reference surfaces into engagement with the headlamp seating surfaces.

The first embodiment of the adapter includes a valving arrangement which enables the suction holding forces generated by the aiming unit to augment the suction holding forces of the adapter unit securing the adapter unit to the headlamp.

Additionally, it is noted that the adapter unit according to the teaching of the invention is capable of being attached to the headlamp being tested, independently of the aiming unit.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. An adapter unit for use with a vehicle headlamp aiming unit that is operable to test the alignment of a first headlamp; the aiming unit having holding means for holding the aiming unit against a surface, and aimer seating surface means capable of orienting the aiming unit with respect to corresponding reference surfaces; said adapter unit being operable to adapt the aiming unit to test the alignment of a second headlamp, diverse from said first headlamp, said adapter unit comprising:
adapter seating surface means corresponding to reference surface means of the diverse headlamp being tested;
adapter reference surface means corresponding to the aimer seating surface means;
means operable to be acted upon by holding forces generated by the aimer holding means for securing the aiming unit to said adapter unit; and
means for transmitting said holding forces generated by the aimer holding means to hold said adapter unit against the diverse headlamp.

2. An adapter unit in accordance with claim 1 wherein said adapter unit includes adapter holding means for generating holding forces independently of said aiming unit for securing said adapter unit to said second headlamp; and said force transmitting means being operable to augment the adapter-generated holding forces with the aimer-generated forces.

3. An adapter unit in accordance with claim 2 wherein said adapter holding means includes adapter suction generating means; the aimer holding means comprising aimer suction generating means; said force transmitting means comprising means for communicating said aimer suction generating means with the adapter suction generating means.

4. An adapter unit in accordance with claim 3 wherein said adapter suction generating means includes a suction cup having a suction cavity; said force transmitting means including housing means defining a suction transmitting channel means for communicating said adapter suction cavity with the aimer suction generating means; and valve means being shiftably mounted in said channel means and responsive to attachment of the aiming unit to said adapter unit for selectively opening and closing said channel means.

5. An adapter unit according to claim 4 wherein said first headlamp is circular-shaped and said diverse headlamp is rectangular-shaped, and further wherein:
said adapter unit includes sleeve means connected to said suction cup,
said sleeve means including chamber means, and chamber by-pass means having axially spaced port means communicating with said chamber means;
said valve means including a piston slidably mounted in said chamber means;
said means operable to be acted upon including an abutment plate secured to said piston;
said suction transmitting means comprising:
said chamber means;
said by-pass means;
passage means communicating said adapter suction cavity with said chamber means, and
conduit means carried by said piston and extending through said abutment plate to communicate said chamber means with the aimer suction generating means;
said abutment plate being operable, in response to inwardly directed force applied thereto, to urge said piston toward said suction cup to produce and maintain a negative pressure within said suction cavity sufficient to hold said adapter unit against the diverse headlamp;
said abutment plate being further operable, in response to the application thereto of an outwardly directed force by said aimer suction generating means to urge said piston away from said adapter suction cup to a position intermediate said axially spaced port means for communicating said channel means and the interior of said suction cup with the suction force from the aiming unit.

6. An adapter unit in accordance with claim 1 wherein said force transmitting means includes frame means carrying said adapter seating surface means and said adapter reference surface means; and said frame means being arranged to be engaged by said aiming unit and urged against the headlamp reference surface means by the aimer-generated holding forces.

7. An adapter unit in accordance with claim 2 wherein said force transmitting means includes frame means shiftably mounted on said adapter holding means; said frame means carrying said adapter seating surface means and said adapter reference surface means; and said frame means being arranged to be engaged by said aiming unit and urged against the headlamp reference surface means by the aimer-generated holding forces.

8. An adapter unit in accordance with claim 7 wherein said adapter unit includes spring means for urging said frame means toward the diverse headlamp, the holding forces generated by the aimer holding means being directed to augment the forces generated by said spring means.

9. An adapter unit operable to be disposed between a vehicle headlamp having reference surface means and a headlamp aiming unit having seating surface means, said adapter unit comprising:
frame means including:
second seating surface means at one end thereof corresponding to the headlamp reference surface means; and
reference surface means at the other end thereof corresponding to the aimer seating surface means;
a suction cup, including a suction cavity, for holding said adapter unit against the headlamp, with said adapter seating surface means engaging the headlamp reference surface means; and
attachment means operable to be gripped by the aiming unit, with the aimer seating surface means engaging the adapter reference surface means.

10. An adapter unit in accordance with claim 9 wherein said adapter unit further comprises force transmitting means including valve means operably connected to said attachment means for communicating said adapter suction cavity with a suction generating means of the aiming unit to augment the suction forces produced by said suction cup of said adapter unit.

11. An adapter unit in accordance with claim 10 wherein said adapter unit includes spring means for urging said adapter frame means against the headlamp reference surface means, said adapter frame means being arranged to be engaged by said aiming unit such that the forces produced by the aimer suction generating means are transmitted to said frame means to augment the forces produced by said spring means.

12. An adapter unit in accordance with claim 11 and further including:
a suction chamber,
by-pass passage means communicating one end of said suction chamber with another end thereof;
conduit means communicating said suction chamber with said suction cavity;
said valve means including piston means having a piston head axially reciprocally mounted in said suction chamber;
said attachment means comprising an abutment surface secured to said piston means;
channel means extending through said plate means and said piston means and communicating with said suction chamber means at a location spaced from said piston head;
said piston means being arranged for selective movement between;
a first position for maintaining a negative pressure in said cavity to provide a holding force sufficient to secure said suction cup to a headlamp being tested, and
a second position communicating said suction cavity with said channel means through said by-pass passage means wherein suction forces produced by the aiming unit are applied to said suction cavity to augment the forces holding the adapter unit to the headlamp.

13. A method for adapting an aiming unit, operable to test the alignment of a first headlamp, to test the alignment of a second diverse headlamp, said method comprising the steps of:
attaching an adapter unit to the diverse headlamp such that adapter seating surfaces on the adapter unit, corresponding to the headlamp reference surfaces, are aligned with and engage headlamp reference surfaces; and
attaching the aiming unit to the adapter unit such that seating surfaces on the aiming unit are aligned with and engage corresponding reference surfaces on the adapter unit.

14. The method according to claim 13 wherein the step of attaching the aiming unit includes the steps of generating holding forces for securing the aiming unit to the adapter unit, and transmitting these holding forces to augment forces generated by the adapter unit for holding the adapter unit to the headlamp.

15. The method in accordance with claim 13 wherein the step of attaching the adapter unit includes the step of attaching a suction cup of the adapter unit to the diverse headlamp; the step of attaching the aiming unit includes the steps of generating a suction force between a suction cup on the aiming unit and an abutment surface on the adapter unit, and shifting a valve connected to said abutment surface to communicate the adapter suction sup with aimer suction cup to augment the suction forces holding said adapter to the diverse headlamp.

16. A method in accordance with claim 15 wherein the step of attaching the adapter unit includes the step of activating a spring to urge an adapter frame portion, carrying the aimer seating surfaces into engagement with the headlamp reference surfaces; and the step of attaching the aiming unit includes the step of urging the aimer seating surfaces against the adapter frame portion to augment the forces produced by said spring in holding the adapter seating surfaces against the headlamp reference surfaces.

* * * * *